US006690316B2

(12) United States Patent
Yankielun (10) Patent No.: US 6,690,316 B2
(45) Date of Patent: Feb. 10, 2004

(54) SYSTEM AND METHOD FOR AUTOMATED ALERTING TO GEOSPATIAL ANOMALIES

(75) Inventor: Norbert E. Yankielun, Lebanon, NH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 7 days.

(21) Appl. No.: 10/256,182

(22) Filed: Sep. 27, 2002

(65) Prior Publication Data

US 2003/0020647 A1 Jan. 30, 2003

(51) Int. Cl.[7] .............................. G01S 13/88; G01V 3/12
(52) U.S. Cl. ............................ 342/22; 342/196; 342/27
(58) Field of Search .......................... 342/22, 27, 196; 73/584, 597, 598, 602, 643

(56) References Cited

U.S. PATENT DOCUMENTS

| 5,420,589 | A | * | 5/1995 | Wells et al. ................... 342/22 |
| 5,469,176 | A | * | 11/1995 | Sandler et al. ............... 343/375 |
| 5,499,029 | A | * | 3/1996 | Bashforth et al. ............. 342/22 |
| 5,673,050 | A | | 9/1997 | Moussally et al. |
| 5,769,503 | A | | 6/1998 | Stolarczyk et al. |
| 6,082,466 | A | | 7/2000 | Gudat |
| 6,094,157 | A | | 7/2000 | Cowdrick |
| 6,225,941 | B1 | * | 5/2001 | Gogineni et al. ............. 342/22 |
| 6,388,629 | B1 | | 5/2002 | Albats et al. |
| 6,445,334 | B1 | | 9/2002 | Bradley et al. |
| 6,496,137 | B1 | * | 12/2002 | Johansson ..................... 342/22 |
| 6,581,466 | B1 | * | 6/2003 | Costley et al. ................. 73/584 |
| 2002/0130805 | A1 | * | 9/2002 | Sugiyama et al. ............ 342/22 |
| 2003/0020647 | A1 | * | 1/2003 | Yankielun ..................... 342/22 |
| 2003/0043067 | A1 | * | 3/2003 | Johansson et al. ............ 342/22 |

OTHER PUBLICATIONS

"Training DHMMs of mine and clutter to minimize landmine detection errors", Yunxin Zhao; Gader, P.; Ping Chen; Yue Zhang; Geoscience and Remote Sensing, IEEE Trans on, vol.: 41 Issue: 5, May 2003 Ps: 1016–1024.*
"A linear prediction land mine detection algorithm for hand held ground penetrating radar", Ho, K.C.; Gader, P.D.; Geoscience and Remote Sensing, IEEE Transactions on, vol.: 40 Issue: 6, Jun. 2002 pp.: 1374–1384.*
Characteristics of the internal radio echoes in the Antarctic ice sheet using a mobile VHF radio echo sounder, Maeno, H.; Uratsuka, S.; Okamoto, K.;. IGARSS '98. 1998 IEEE International, Jul. 6–10, 1998 pp.: 980–982 vol. 2.*
Laboratory verifictaion for a forward–looking multi–receiver mine–detection GPR,Fischer, C.; Wiesbeck, W.; Geoscience and Remote Sensing Symposium, 2000. Proceedings. IGARSS 2000. IEEE2000 International, Jul. 24–28, 2000 P(s): 1643–1645 vol. 4.*
"Hardware cancellation of the direct coupling in a stepped CW ground penetrating radar", Kabutz, M.H et al; IGARSS '94. 'Surface andAtmospheric Remote Sensing: Technologies, Data Analysis and Interpretation'.,Int'l, Aug. 8–12, 1994 Ps: 2505–2507 vol. 4.*

* cited by examiner

Primary Examiner—John B. Sotomayor
(74) Attorney, Agent, or Firm—Earl H. Baugher, Jr.

(57) ABSTRACT

An automated inexpensive system and reliable method for detecting spatial anomalies in real time, allows an unsophisticated operator to detect hidden anomalies efficiently and safely. In a preferred embodiment, an FM-CW radar front-end communicates with a personal computer incorporating specific filter and processing circuitry, including an A/D converter and a DSP. A target volume is illuminated from just above its top surface and return signals processed using the PC as programmed with a purpose-built algorithm. Data are down-converted to audio frequencies for ease in handling using inexpensive audio frequency circuitry. For use in avoiding bridged (hidden) crevasses during operation in snowfields, a version is mounted on a long boom extending from the front of the platform on which it is installed, typically a lead vehicle of a convoy. Heretofore, expensive systems requiring full-time monitoring by a well-trained operator were the only safe and reliable solution to insure safe traversal of snowfields.

21 Claims, 8 Drawing Sheets

SYSTEM AND METHOD FOR AUTOMATED ALERTING TO GEOSPATIAL ANOMALIES

STATEMENT OF GOVERNMENT INTEREST

Under paragraph 1(a) of Executive Order 10096, the conditions under which this invention was made entitle the Government of the United States, as represented by the Secretary of the Army, to an undivided interest in any patent granted thereon by the United States. This and related patents are available for licensing. Please contact Sharon Borland at 603 646-4735 or Phillip Stewart at 601 634-4113.

FIELD OF THE INVENTION

The present invention relates generally to automated detection and alerting to the presence of hidden structure. More particularly, it provides a low-cost, fully integrated, mobile, early warning system for continuous detection and early warning of bridged crevasses. For certain applications, it may be solar powered with battery backup, with an option for at least one battery to be solar rechargeable.

BACKGROUND

Bridged crevasses present a challenge and hazard to parties traversing ice streams and glaciers in the Antarctic, the Arctic and elsewhere. While an open crevasse is usually visually discernible and therefore avoidable, there is little or no visual cue to the presence of a bridged crevasse or to the thickness of the overlying snow bridge. When in terrain where there is probable occurrence of bridged crevasses, progress is inhibited; parties remain roped together and travel slowly and deliberately. Personnel are at risk of injury or death if a snow bridge is unwittingly breached. Secondarily, loss of vehicles, sleds and equipment may occur.

Figure 1:
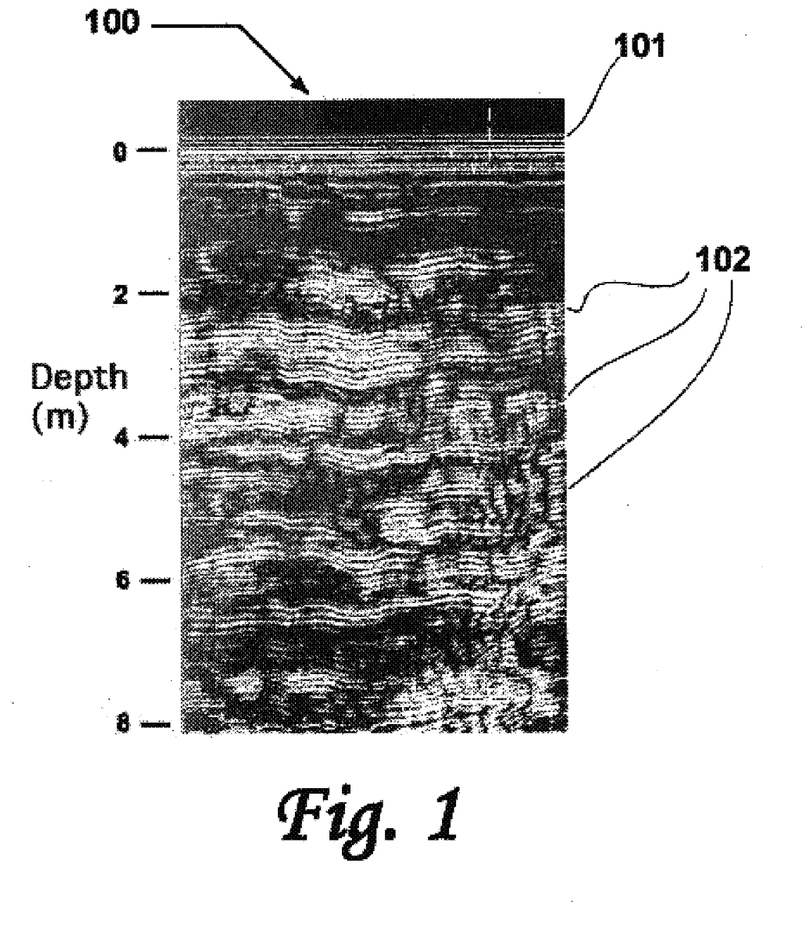
FIG. 1 depicts an image derived from a radar signature of a snowfield having no voids.
Figure 2:
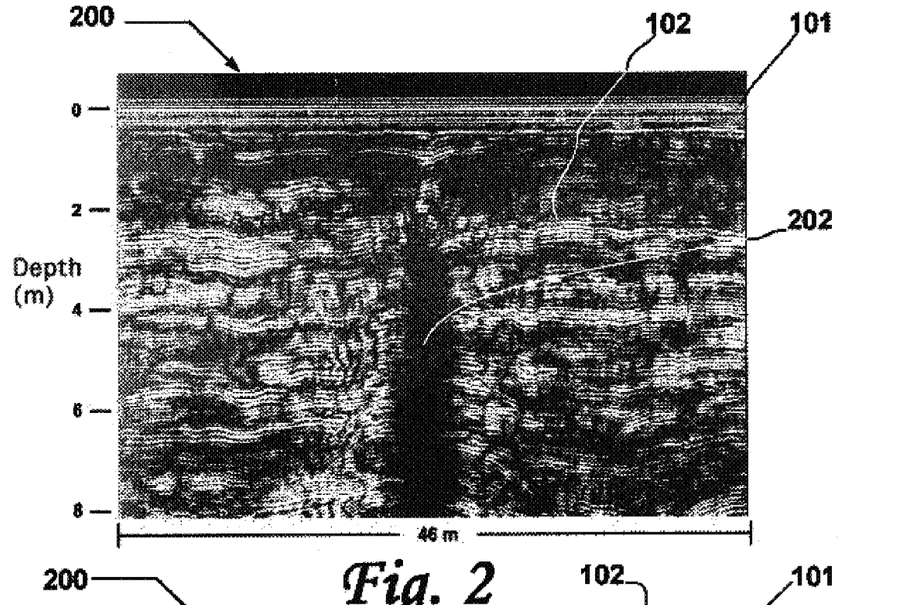
FIG. 2 depicts an image derived from a radar signature of a snowfield having a bridged crevasse.
Figure 3:
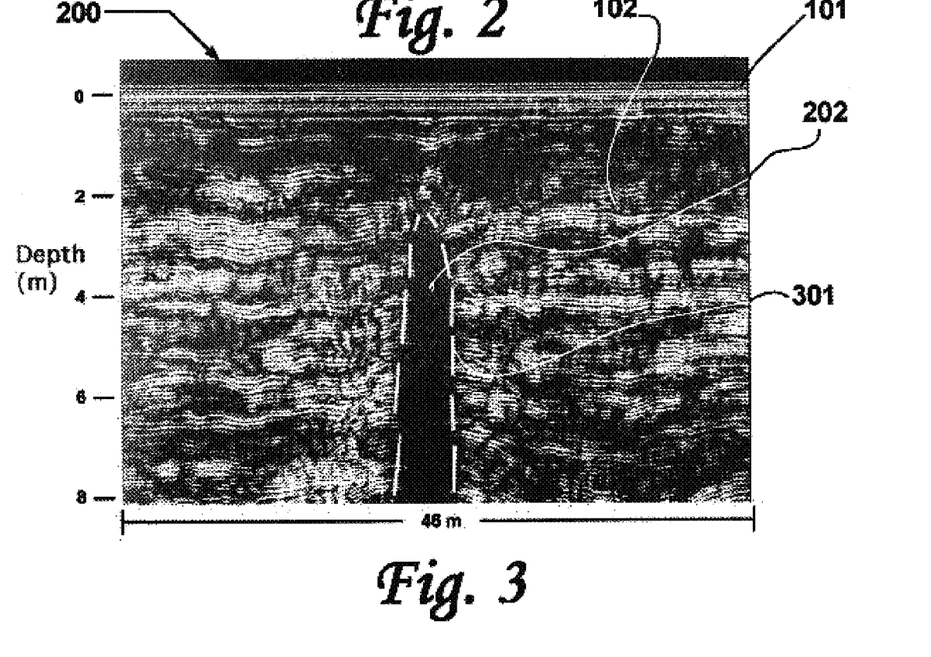
FIG. 3 depicts an image derived from a radar signature of a snowfield having a bridged crevasse, the convex parabola indicating a crevasse being highlighted by a dashed line.

The current state-of-the-art for bridged crevasse detection, warning, and spatial parameter quantification consists of two methods. Probing is a low-tech solution requiring a securely roped individual to carefully approach a suspected snow bridge and repetitively insert a long, thin wand deep into the snow, feeling for an underlying void. This "dipstick" approach can provide an approximate indication of the thickness of a snow bridge and the horizontal extent of the underlying abyss. The second method is an application of ground penetrating radar (GPR). This application has been discussed in the literature and has seen limited use in several forms for many years. Recent applications of this technique have been quite successful in locating bridged crevasses in the path of over-snow vehicles. The conventional GPR alternative, typically using a research-grade radar system, is hi-tech, expensive, requires a trained operator to interpret, and thus is used less frequently. In a typical application, a GPR antenna is positioned on a long boom ahead of the traversing vehicle or party. Electromagnetic pulses are transmitted in a broad antenna lobe pattern having vertical and some near-horizontal components. These pulses reflect from underlying snow and firn density boundaries, i.e., a boundary indicative of a dielectric contrast, and refract from the near-vertical walls of proximate crevasses. The boundary between the snow, firn or ice, and the air-filled void of the crevasse provides a strong dielectric contrast and reflector and refractor of electromagnetic energy. The typical radar signature (return) of snow and firn stratigraphy 100 devoid of crevassing is a series of nearly horizontal layers appearing as horizontal traces 102 below the surface 101 on a profile image as shown in FIG. 1. If a crevasse is encountered, the crevasse radar signature 200 is displayed as a convex hyperbolic curve 202, the apex being directly over the crevasse and the "tails" trending deeper into the snowpack as shown in FIG. 2. FIG. 3 annotates the "crevasse signature" 200 of FIG. 2 with a dashed line 301 to delineate the crevasse. Note that this crevasse signature 200 is intermixed on the display with the stratigraphic signature 100 depicted in FIG. 1.

Conventional GPR operation while traversing suspect snow and ice fields employs a trained operator constantly observing a radar display to discern the hyperbolic crevasse signatures 200, halting traversal as the convex hyperbolic curve 202 appears on the display. This important activity is manpower intensive and is subject to a high fatigue factor with resultant dire consequences if not carefully monitored. Automating bridged crevasse proximity detection and warning using a low-cost designed-for-purpose radar system has positive implications for safety, economics and efficiency. It may be applied to scientific, search-and-rescue, industrial and commercial trans-glacial traversing in the Antarctic, the Arctic, and elsewhere.

A preferred embodiment of the present invention provides an automatic, portable, inexpensive, designed-for-purpose, crevasse detection system that is easy to operate and may be applied to field party and general snow field traversal scenarios to include diverse activities such as identifying the snow cave of a polar bear for investigation by a wildlife biologist.

SUMMARY

An inexpensive system integrates the front-end of a commercial-off-the-shelf (COTS) ground-penetrating radar, a COTS personal computer (PC), and a specialized algorithm to alert to geospatial anomalies in real time. The alert may be aural, indicating the relative proximity of a geospatial anomaly. The system may also include a visual alert that indicates the relative proximity of a geospatial anomaly, or both an aural and visual alert.

In a preferred embodiment, the geospatial anomaly of interest is a crevasse, in particular, a bridged (hidden) crevasse. The bridge may result from accretion of snow, ice, firn, or any combination thereof.

In a preferred embodiment, the radar front-end is an FM-CW radar front-end, comprising an antenna (although multiple antennas may be used), a transceiver incorporating a circulator, a local oscillator, and a mixer.

In a preferred embodiment, the processor is a personal computer that incorporates at least a low pass filter (LPF), a high pass filter (BIF), an analog-to-digital (A/D) converter, a digital signal processor (DSP), and a display, such as a CRT or a liquid crystal display (LCD). For aural alerts, the PC further incorporates a sound card connected to at least one speaker.

The specialized algorithm processes returns from operation of the radar front-end in A and B parallel channels to establish a running average of vectors in the A channel for comparison to each single vector being processed currently (and concurrently) by B channel, such that the comparison permits detection of a spatial anomaly within a target volume illuminated by the radar front-end.

Also provided is an inexpensive method of detecting spatial anomalies within a target volume, the anomalies not otherwise evident without use of methods that are expensive, time-consuming, or both. A preferred embodiment of the method comprises:

illuminating a target volume with electromagnetic energy;

using circuitry to derive audio frequencies representing reflections of the electromagnetic energy;

establishing vectors representing the audio frequency versions of the reflected energy in A and B parallel channels, such that a running average of the vectors is maintained in channel A for comparison to a current vector being processed in channel B; and using this comparison to initiate an alert.

The cost of equipment for this processing is minimized through down conversion to audio frequencies prior to processing.

In a preferred embodiment, the anomalies are voids otherwise hidden from observation. Of particular interest are voids representing crevasses hidden by accretion of snow, ice, firn, and any combination thereof. Methods are provided to provide an alert aurally, visually, or as a combination of both.

Aural alerts are established by processing scaled signals in parallel to establish the frequency and volume of the aural alert. Visual alerts are established by:

subtracting the running average vector of channel A from the current vector processed in channel B;

filtering the result of the subtracting to remove spikes that cause "speckle;"

stacking by m, a whole number, the filtered result to achieve a stacked value, clipping the stacked value to eliminate any amplitude variability that may introduce adverse effects;

peak extracting the clipped stacked value to establish a bin number for it, the bin number providing an estimate of distance to a nearest edge of the spatial anomaly;

using the bin number to drive a visual alarm function; and displaying a visual alarm.

There are several advantages to a preferred embodiment of the present invention:

self-monitoring standoff geospatial anomaly detection;

useful for establishing a database of common stratigraphy types;

reduced workload and stress on detection system operator(s);

automated detection of geospatial anomalies, including bridged crevasses;

automated visual and aural alarm upon detection of a geospatial anomaly;

inexpensive to implement;

uses COTS hardware;

uses commercially available software;

suitable for applications such as determining archaeological sites of importance prior to employing heavy machinery for road building or construction;

easily reconfigurable for updating or use in other applications;

easy to learn, thus reduced training time and shortened learning curve;

increased speed of traversing surfaces of unknown stability;

facilitates search and rescue operations;

reliable;

easily maintained; and durable.

For a lightweight, inexpensive embodiment that may be mounted on a PC board, the antenna may be any of: a stripline antenna, a stripline beam antenna, a Yagi stripline beam antenna, and a log periodic array (LPA) stripline beam antenna. The simplest embodiment for this antenna is a printed circuit wide-band "bow-tie" dipole antenna.

Preferably, the processing sub-assembly includes analog circuitry connected to the transceiver sub-assembly through a mixer. This analog circuitry conditions output signals from the mixer for digital processing. Digital circuitry receives conditioned output signals from the analog circuitry, converts it to digital format, and employs a complex algorithm for identifying geospatial anomalies such as a bridged crevasse or a snow cave. Display and alerting devices receive output from the digital circuitry to indicate the geospatial anomaly and provide a required alert.

In a preferred embodiment, the analog circuitry includes a first amplifier for amplifying the signal products from the mixer, a low pass filter (LPF) that passes only those frequencies that correlate to a pre-specified range, a second amplifier for amplifying the output of the LPF and a high pass filter (HPF).

The digital circuitry includes an analog-to-digital (AID) converter for converting the output of the high pass filter, a digital signal processor (DSP) for performing a Fast Fourier Transform (FFT), and a audio-visual display. The DSP implements a complex algorithm providing input to at least two methods of alerting, visual and audio.

If used with a robot, the system may further include a communications device including a UHF or VHF radio link, or a system providing an autodialer, a cellular phone and a cellular phone antenna. The frequency band of the radar system must be significantly displaced in frequency from the transmit frequency of any communications frequency (radio telemetry) to prevent interference between the radar and communication link and visa versa. To facilitate passing data, the radar signal may be converted from electrical to optical and passed from the radar transceiver to the data acquisition computer via an optical fiber. Preferably, all system components noted above are enclosed within a weatherproof enclosure.

In one embodiment, the system includes it own power source. The power source may include a solar panel augmenting a rechargeable battery. Further, a preferred embodiment may include its own boom and mounting bracket. In addition to the system itself, a unique method of implementing a geospatial anomaly detection capability is provided.

Provided is a method for detecting geospatial anomalies that may otherwise be hidden from view or other inexpensive means of detection. It comprises mounting a system of the present invention approximately level with a surface such as the surface of a snow field at a pre-selected look angle in azimuth and elevation; providing power to the system; illuminating at least part of a target volume with a signal containing electromagnetic energy; receiving energy reflected from the target volume as a result; processing the reflected energy together with a reference signal sampled from the transceiver to produce a difference frequency signal representing the difference in frequency between the reference signal and the reflected energy; establishing a value of the difference frequency signal; processing any non-zero value difference signals by implementing a complex algorithm; and using the output of the algorithm, collecting background data as a running average, and providing notification of any occurrence of the pre-specified geospatial anomaly. The notification, at least in part, may be audio, visual, or both.

A preferred implementation uses an antenna in direct contact with the surface e.g., snow or ice, and positioned at nadir (directly downward). Other embodiments may use slight "slant angles" to gain some marginal standoff distance advantage.

In a preferred embodiment, an autonomous geospatial anomaly detecting and alerting system is provided in which components of the system as described above are mounted on a single printed circuit (PC) board. The existence of a pre-specified range of frequencies is correlated to an expected geospatial anomaly such as may be representative of a hidden void, for example.

Ground penetrating radar has long been used for archeological and utility location purposes. While the basic radar hardware design of an embodiment of the present invention could be used for those purposes, the crevasse-location algorithm is specific to detection of void anomalies in snow, ice and glacier fields. Other algorithms may be developed and "tuned" for these other applications although these applications present a more difficult problem and are not pursued as an application of the present invention. A glacial snowfield presents a fairly benign target volume for ground penetrating radar with few anomalies present internally. In the general condition of penetrating the earth, however, there are boulders, debris, and buried manmade objects that display, possibly confusing the snowfield-specific crevasse-detecting algorithm of the present invention.

An embodiment of the system may be powered by any of a number of sources including a source remote from its location and a backup source.

In one embodiment, a preferred embodiment of the present invention is mounted on a boom at the front of a mobile platform (to include a self-powered vehicle, a remotely piloted vehicle, a robot, or even a mammal) that is proceeding toward a target volume to be observed such as bridged crevasse or snow cave. The target volume may be remote from the controller of the mobile platform. The controller may also be mobile, thus a wireless communications device may be provided in one embodiment. A reference signal, $f_{source}$, is transmitted from the antenna towards the target surface. Resultant reflected radiation, i.e., the "backscattered" portion, is mixed with a portion of the transmitted signal sampled for that purpose. This mixing produces a difference frequency, $f_{Dif}$, which is then processed to distinguish internal structure of the target volume.

Digital circuitry implementing a complex algorithm establishes the presence of a geospatial anomaly within the target volume. Using a complex algorithm, the anomaly is identified and an alert displayed both visually and aurally. Upon such determination, the system may send a notification, preferably over a wireless communications device, to a platform controller at a remote location.

Further advantages of the present invention will be apparent from the description below with reference to the accompanying drawings, in which like numbers indicate like elements.

DETAILED DESCRIPTION

To provide automated crevasse detection, the basic principle employed is discerning the difference in GPR signatures (radar returns) between a near continuous, steady-state environment and a transient and occasional event. For purposes of the present invention the radar antenna is disposed close to the surface of the volume to be illuminated. Anomaly detection is accomplished by detecting and comparing recently acquired time and spatially averaged processed GPR signatures to "real time" signatures. Typically, crevasse-free snow, firn, and ice fields present a GPR signature of relatively long-term, monotonic, horizontal, steady-state or slowly spatially-changing stratigraphy 100 in layers 102 as shown in FIG. 1. As depicted in FIG. 2, crevasse signatures 200 present rapidly changing, hyperbolic representations 202 interrupting the steady state layers 102 depicted in FIG. 1. By developing a time and spatial average of the background state of stratigraphy 100; performing some signal processing; and subtracting the averaged background from instantaneous radar data "snapshots" or real time signatures, the crevasse signature 200 may be detected, extracted, and used to provide a timely proximity warning. To perform this function, appropriate hardware 400, as shown in FIG. 4, is used and a complex digital signal-processing algorithm is implemented.

Figure 4:
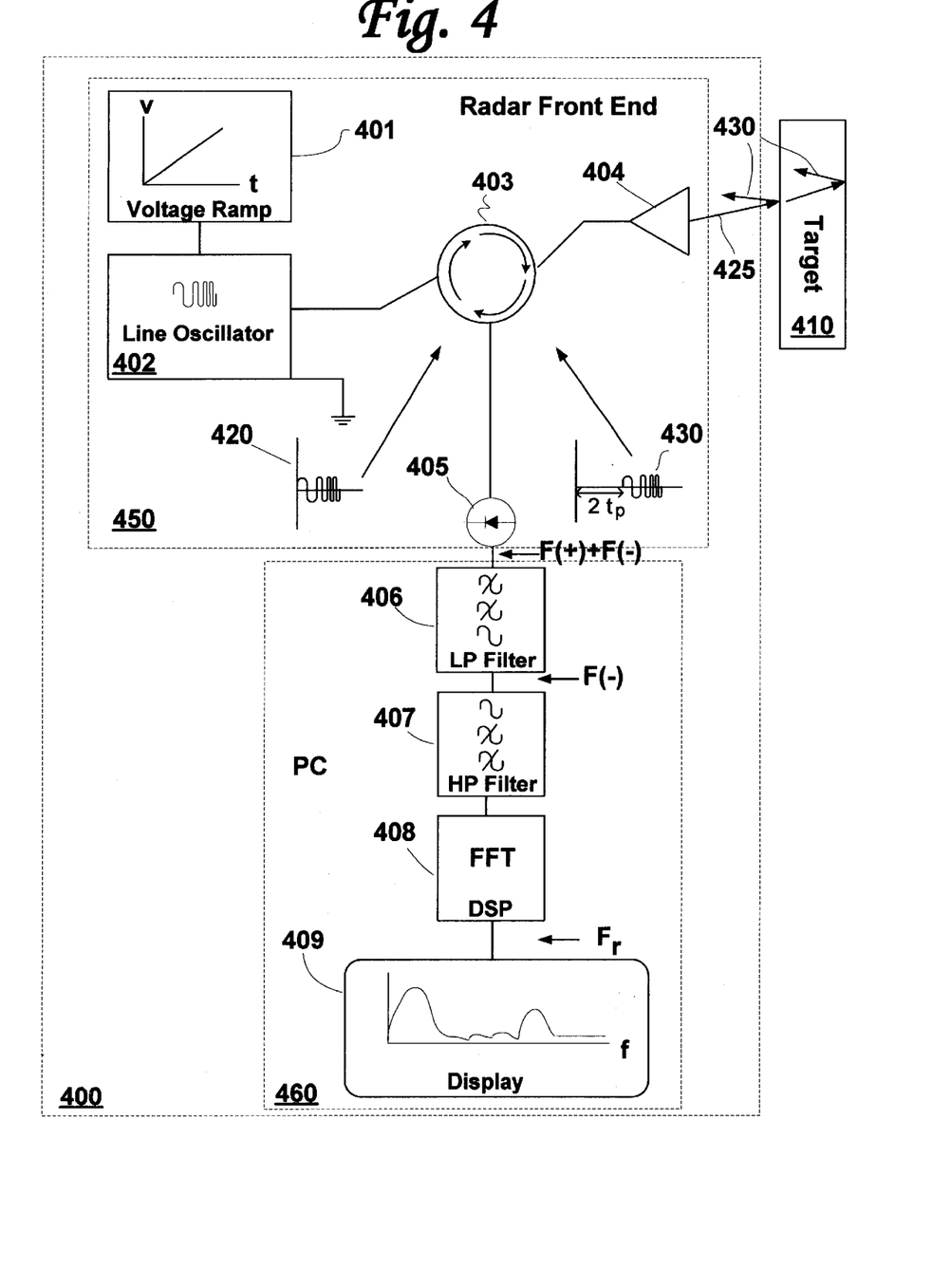
FIG. 4 is a schematic depicting the relationship of the principle components of a preferred embodiment of the present invention.

Refer to FIG. 4. The hardware 400 incorporates a designed-for-purpose, frequency-modulated continuous wave (FM-CW) radar front end comprising a transmitter 401, a circulator 403, at least one antenna 404 and a mixer 405. It also includes unique processing circuitry, including an LPF 406, an HPF 407, a DSP 408 implementing an FFT and a display 409. The unique processing circuitry may be incorporated in a COTS PC 460. Although implementation of an embodiment of the present invention may be done with conventional "pulse" or "impulse" radar techniques, an FM-CW version facilitates inexpensive audio-frequency digital signal processing techniques. Thus, the concepts disclosed herein allow implementation of pulse-based radar systems but a pulse-based system is not the preferred embodiment. Depending upon application, the system can be implemented to operate within any appropriate microwave band. Using conventional systems, field GPR applications have been made in the L-, C-, X- and K-bands. Further, it is possible and practical to apply this technique using VHF or UHF GPR systems.

For crevasse detection in snow and ice fields, a center frequency of 300 to 3000 MHz would be optimum, considering snow and ice penetration, simplicity and economics of electronic components, and simplicity of design and physical dimensions of radar antennas. Higher or lower frequencies may be used with varying levels of success and implementation costs.

FM-CW radar principles are well known and have been described frequently in the literature. Botros, A. Z. and A. D. Oliver, *Analysis of Target Response of FM-CW Radar*, IEEE Trans. Antennas and Propagation, Vol. AP-34, No. 4, 575–581, 1986. Skolnick, M. L., *Introduction to Radar Systems*, McGraw-Hill, New York, 581 pp., 1980. Stove, A. G., *Linear FMCW Radar Techniques; IEE Proceedings, Vol.* 139, No. 5, 343–350, 1992. Yankielun, N. E., et al., *Thickness Profiling of Freshwater Ice Using a Millimeter-Wave FM-CW Radar*, IEEE Trans. Geosci. Remote Sensing, 30, 1094–1100, 1992. These references discuss the principles in depth. An FM-CW radar can be implemented in a variety of configurations using single or dual antennas. Refer to FIG. 4. For simplicity, a single-antenna (transceiver antenna) implementation 404 is described. A constant amplitude sinusoidal signal 425 is transmitted toward a target volume 410. The signal's frequency, over an operating band, $\Delta F$, is increased linearly with time, over a duration, $t_{swp}$. This signal is produced by a voltage-controlled oscillator (VCO) 402 that may sweep a band from hundreds of MHz to several GHz as shown using a typical linear voltage ramp 401.

The swept frequency range determines the maximum distance range and spatial resolution of the FM-CW radar. The greater this sweep range is, the smaller the operating distance (range) of the radar and the higher the spatial resolution. This swept frequency range may be discussed in terms of percent of center frequency. A sweep signal that has a sweep range of 30% to 50% of center frequency is easily and inexpensively implemented in hardware. For example, a radar that has a center frequency of 500 MHz, sweeping a 30% bandwidth yields a 150 MHz sweep, typically implemented symmetrically about the center frequency, i.e., swept between 425 MHz and 575 MHz.

The signal reflected from the target, or "radar return" 430, delayed by the round-trip propagation time, $2t_p$, is mixed with a sample 420 of the VCO 402 output 425. This sample 420 is fed directly to the circulator 403 with a minimal, but known delay time. The mixing process produces sum, $F_{(+)}$, and difference frequency, $F_{(-)}$, signals at the mixer 405. It is passed through an LPF 406 to retain only $F_{(-)}$, typically a signal in the audio frequency range. This signal is further refined by passing through an HPF 407. After Fourier transformation of $F_{(-)}$ in a DSP 408, one component, $F_r$, is yielded. $F_r$ is proportional to the range, R, to the target volume. This may be displayed on the CRT 409 of a PC 460. The relationship between $\Delta F$ and $F_r$ is given by $$t_p = R \frac{n}{c}, \tag{2}$$

where c is the velocity of light in a vacuum ($3 \times 10^8$ m/s) and n is the index of refraction of the medium in which it is desired to operate, e.g., snow, ice or firn.

Substituting Eqn. (2) into Eqn. (1) and solving for R, in meters, we obtain $$R = \frac{(F_r)(t_{swp})c}{2(\Delta F)(n)}. \tag{3}$$

The theoretical equivalent 3-dB width of the spectral pulse, $w_p$, in the time domain is determined by the band swept by the FM-CW signal 425, such that $$w_p = \frac{1}{\Delta F}. \tag{4}$$

For the measurement of snow depth, d, in meters, from the top surface of a snowpack to some internal feature (such as the bottom of a snow bridge over a crevasse), Eqn. (3) becomes $$d = \frac{(F_{r2} - F_{r1})(t_{swp})c}{2(\Delta F)(n)}, \tag{5}$$

where:
$F_{r1}$ is the difference frequency due to the reflection from the top of the snowpack,
$F_{r2}$ is the difference frequency due to the reflection from the bottom of the snowbridge (top of the crevasse), and
n is the index of refraction of the snowpack that can be calculated by $$n = \sqrt{1 + 1.9\rho}, \tag{6}$$

where $\rho$ is the density of the snowpack in gm/cm$^3$.

For lossless media (as assumed for dry snow), the index of refraction is the square root of the relative dielectric permittivity.

Since the $F_{r1}$ and $F_{r2}$ signals are within the audio frequency spectrum, they may be acquired easily and processed by an inexpensive analog-to-digital (A/D) converter and DSP engine. A special DSP algorithm is used for processing the radar return 430 to perform automatic crevasse detection and warning.

Refer to FIG. 4. The hardware 400 for the system incorporates two major components: a radar front-end 450 and a personal computer (PC) 460 incorporating a digital signal processor (DSP) 408. The PC 460 is programmed with a purpose-built DSP software algorithm. Both the radar front-end 450 and personal computer 460 may be powered by a DC source, such as a 12-volt rechargeable battery (not shown separately) or that provided by the carrier vehicle (not shown separately).

The radar front end 450 may comprise either a single antenna 404 or a pair of antennas (not shown separately) together with the necessary radar transceiver electronics. In a preferred embodiment, the radar front-end 450 is a conventional FM-CW radar built from commercial off-the-shelf (COTS) components. This system may be implemented using a pulse or impulse type radar with minor modification to the interface electronics and signal processing circuitry and algorithm. FM-CW is the preferred implementation.

Figure 9:
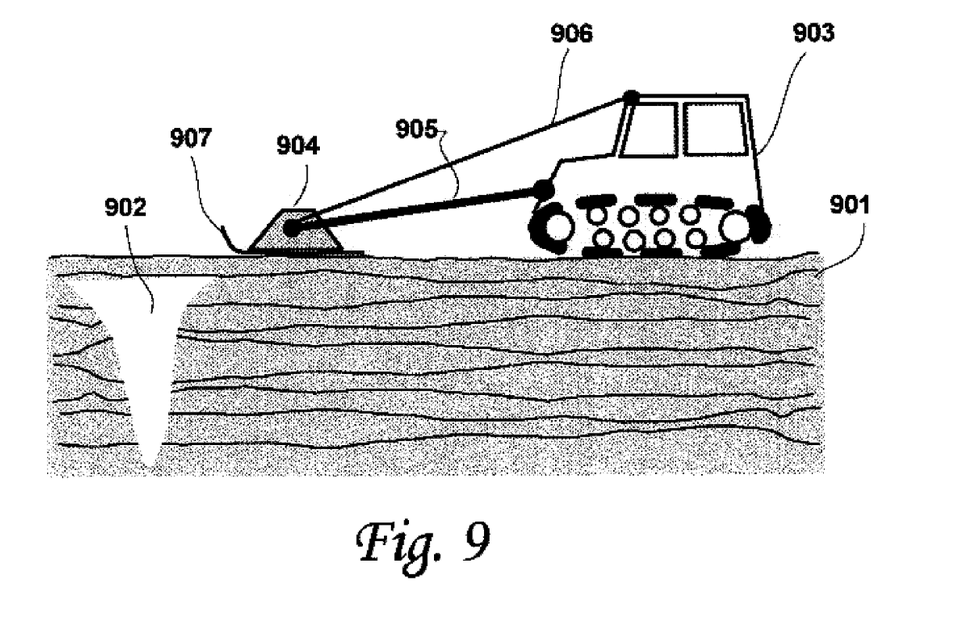
FIG. 9 is a cartoon depicting a profile view of an installed embodiment of the present invention during operation.

Refer to FIGS. 4 and 9. A tracked vehicle 903 is depicted traversing a snowfield 901 towards an unseen bridged crevasse 902. In a preferred embodiment, the radar front end 450 is mounted in an enclosure 904 on a lightweight boom 905 that extends ten or more meters in front of the lead vehicle 903 in a traverse train, for example. Controls for the radar front end 450 and data return are provided via appropriate links 906. The enclosure 904 is mounted on a skid 907 to position the radar's antenna 404 as close to the surface of the snowfield 901 as possible.

Digital signal processing may be performed using a conventional laptop computer 460 equipped with an add-in, 16-bit A/D converter (not shown separately) and a DSP 408. This combination of components, with some minor interface hardware (not shown separately), produces the linear voltage ramp as depicted at 401 that drives the linear oscillator 402 of the FM-CW radar front end 450 as well as performing the signal acquisition, processing, display, aural warning annunciator and data storage functions.

The DSP algorithm is written in an appropriate computer language supported by the chosen DSP engine, typically a variant of "C" or "C++." While there are numerous variations for implementing this application, a preferred embodiment employs software using the high-level graphical user interface (GUI) language, HYPERSIGNAL® Ride (Hyperception, Inc., Dallas, Tex.).

The analog audio frequency signal, $F_{(-)}$, from the output of the mixer 405 and filters 406, 407 is input to the A/D converter controlled by the PC 460. The radar return 430 from each FM-CW linear frequency sweep is digitized and placed in 1024 (or an appropriate "power of 2" number of "bins" or data points, e.g., 512, 2048, 4096, etc.), 16-bit bins. For optimum resolution and reduced computational effort, a 1024-bin vector is the preferred implementation. The "ensemble" of these bins represents a single mathematical "vector" time-series to be processed by the DSP algorithm. A continuous series of sequential data vectors comprises the data record of a profile of radar returns 430. Processing of these vectors individually, and as an ensemble to attain a running average, is used to yield the crevasse detection and alerting function.

Figure 5:
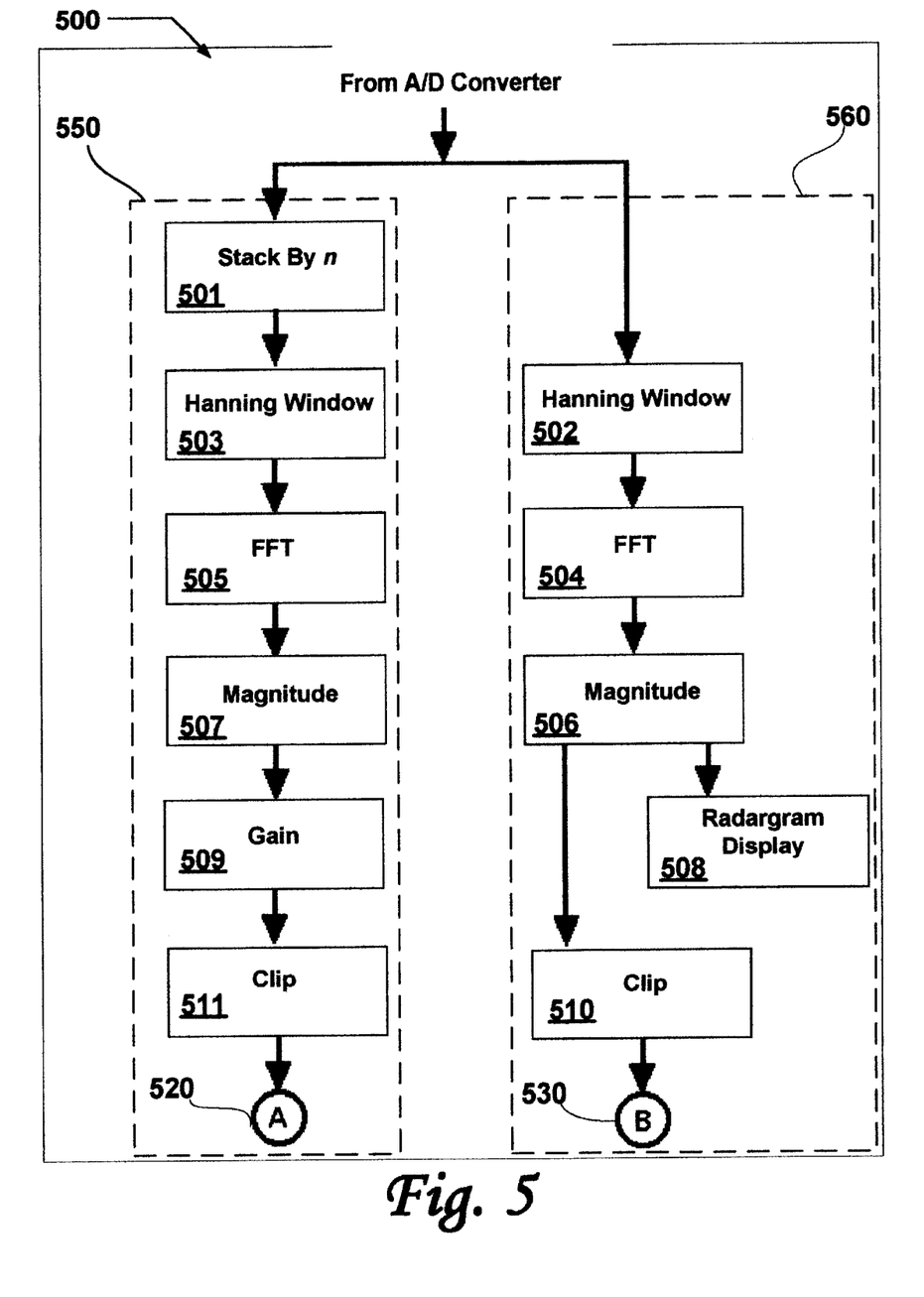
FIG. 5 is a flow diagram of first parallel processing actions taken on digitized signals from an A/D converter of the present invention.
Figure 6:
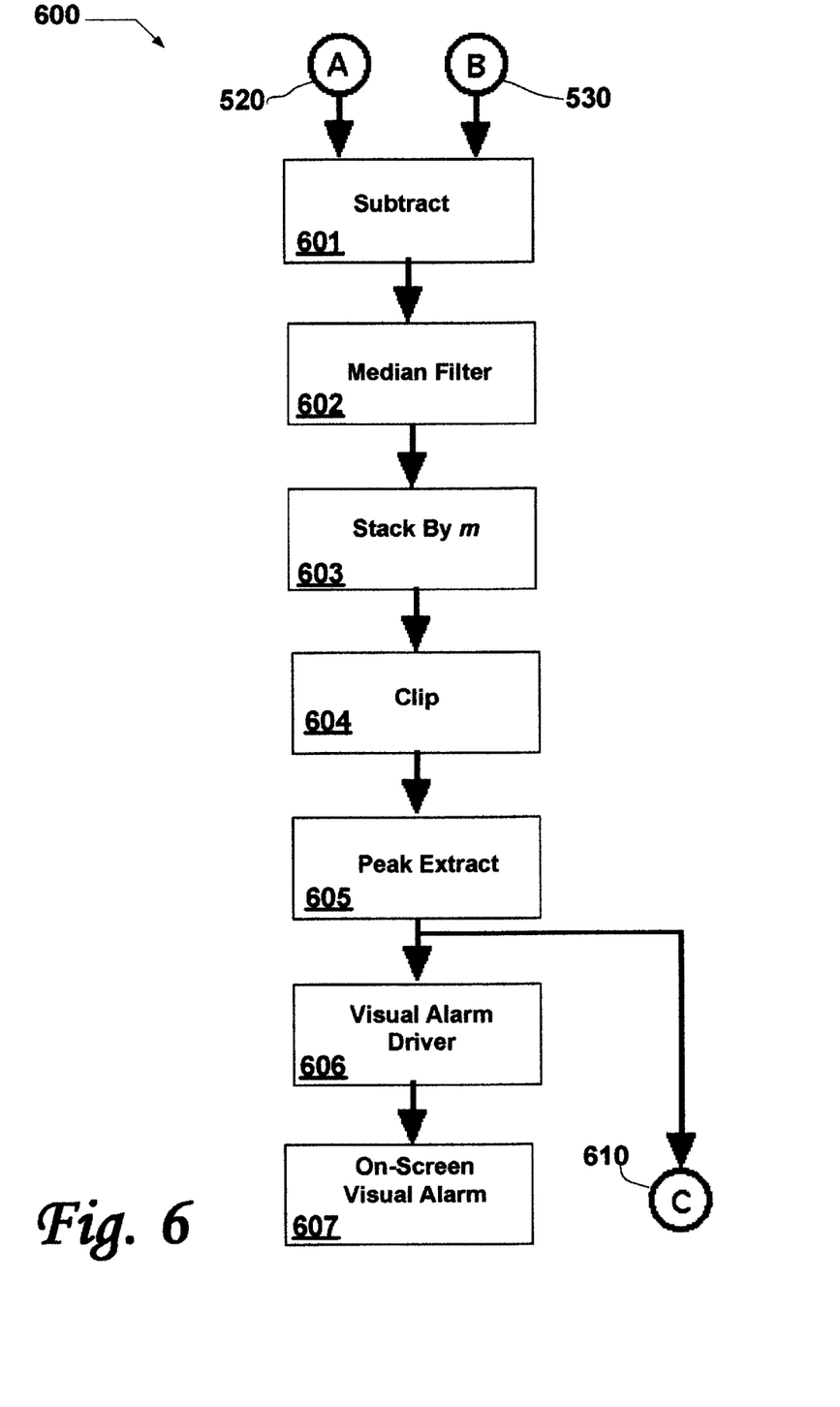
FIG. 6 is a flow diagram of second processing actions taken in combining the parallel processed signals of the first parallel processing actions.
Figure 7:
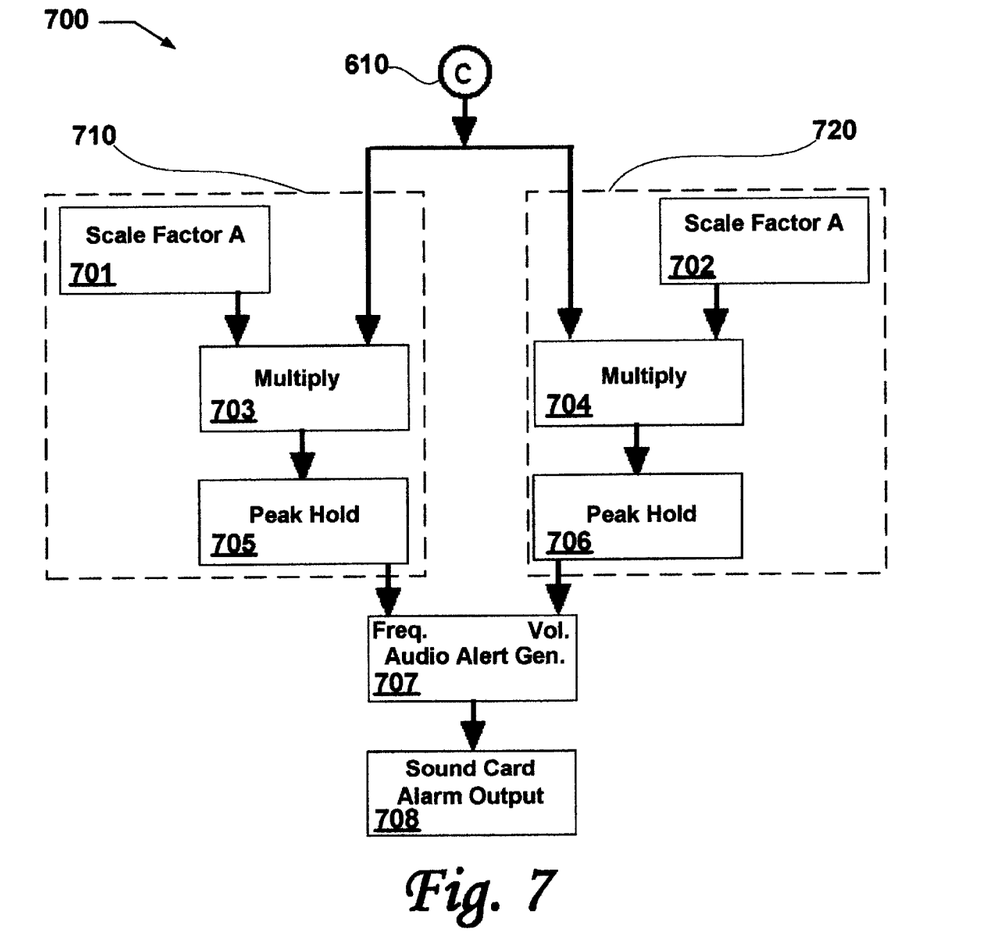
FIG. 7 is a flow diagram of final processing actions taken on processed signals from the second processing action, inserting two scale factors for further parallel processing to enable an audio alert function.

Refer to FIGS. 5–7 for the high-level flow diagram 500, 600, 700 for the complex DSP algorithm used in a preferred embodiment. In the initial processing 500, the data stream of vectors from the A/D converter is split into two parallel paths 550, 560 with outputs to A 520 and B 530 respectively. In the first path 550, a sequence of n vectors is "running averaged" or "stacked by n" 501. As an example, the initial implementation of the DSP algorithm employed a value of n=48. This parameter may be set by the user for best results based on experiment or operator experience. Selection of a value will depend on several variables, including the sweep cycle of the radar front end 450 or the pulse repetition rate of the radar (if a pulse radar is used) and the ground speed of the platform. This averaging provides an inherent temporal low-pass filter, i.e., a time-averaged background signal with which individual vectors are sequentially compared later in the process. In both legs 550, 560 of the parallel process, the data streams are then Hanning-windowed 502, 503 and then processed by a $k^{th}$-order fast Fourier transform (FFT) 504, 505. Note that, although the signals are Hanning-windowed in a preferred embodiment, other suitable windowing techniques may be employed, although use of the Hanning window is the most straightforward and suitable for the purpose. As an example, a $10^{th}$-order FFT is performed on a 1024-bin time-series data vector, resulting in a 1024-bin frequency-domain vector.

The magnitude 506, 507 of each transform in each "leg" is determined, producing a power spectrum of the initial time-series data vector. Gain 509, including negative gain (attenuation), is added to the running-average processed data stream 550 to scale it appropriately to each data vector. The power spectrum vectors of the non-stacked data stream 560 are output in spectrogram format in an on-screen display 508. This display 508 shows the stratigraphy 100, e.g., for the snow and firn layering, or it will show the inverted hyperbolic signature 200 of any nearby bridged crevasse as depicted at 202.

The data from both channels 550, 560 are then clipped 510, 511, i.e., peak limited, to the same level. This peak limiting is used to further scale the data from both channels 550, 560, eliminating some amplitude variability that would have an adverse effect in the next processing step. The data 520, 530 from each channel 550, 560 are now processed 600 in the same channel. The most recent (real time) single-scan vector B 530, is subtracted 601 from the running-averaged vector, A 520, to assert a background removal function. The stacked channel 550 is an inherent temporal low-pass filter, attenuating impulse or short duration events and leaving the averaged trend intact. In an embodiment useful for surveying snowfields, the stratigraphy 100 of snow and firn layering is relatively monotonic over lateral distances much greater than the span of a crevasse, thus making background removal a generally viable option. Further filtering is performed by a median filter 602. The median filter 602 removes spikes in the data that cause "salt and pepper noise", or "speckle."

Stacking 603 is accomplished by smoothing the data m times. As an example, for initial implementation, m was set at 8. This parameter is adjustable by the user based on experiment or actual experience.

Figure 8A:
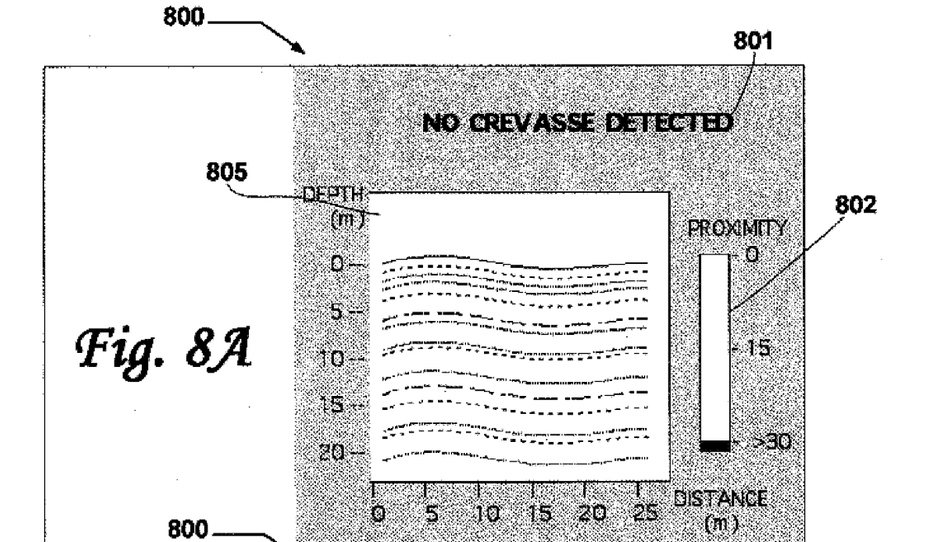
FIG. 8A is a cartoon depicting a normal status of a visual display that may be used with a preferred embodiment of the present invention.

Refer to FIG. 8A. There are two possible outputs from this filtering process. Under the "no-warning" condition, low-level noise is output, i.e., no further manipulation of the signal is undertaken prior to output as C 610. This condition is displayed in FIG. 8A. This noise is the residual product of the subtraction of the two parallel signal-processing legs 550, 560 indicating very little difference between the averaged (background), A 520, and the instantaneous vector, B 530.

The other possible output occurs when a crevasse is detected. The output signal from the subtraction 601 comprises a dominant spectral line 202, i.e., a narrowband spectral "pedestal," that sweeps across the pre-specified swept-frequency band at a frequency inversely proportional to the distance between the radar's antenna(s) 404 and the crevasse. As the radar antenna 404 closes on the crevasse, this spectral pedestal 202 exhibits a reduction in frequency while, conversely, on moving away from a crevasse, the frequency increases. This spectral pedestal 202, is clipped 604 and processed to "peak extract" 605 the location (bin number) of the peak, thus providing the distance to the nearest, or leading, edge of the pedestal 202.

Figure 8B:
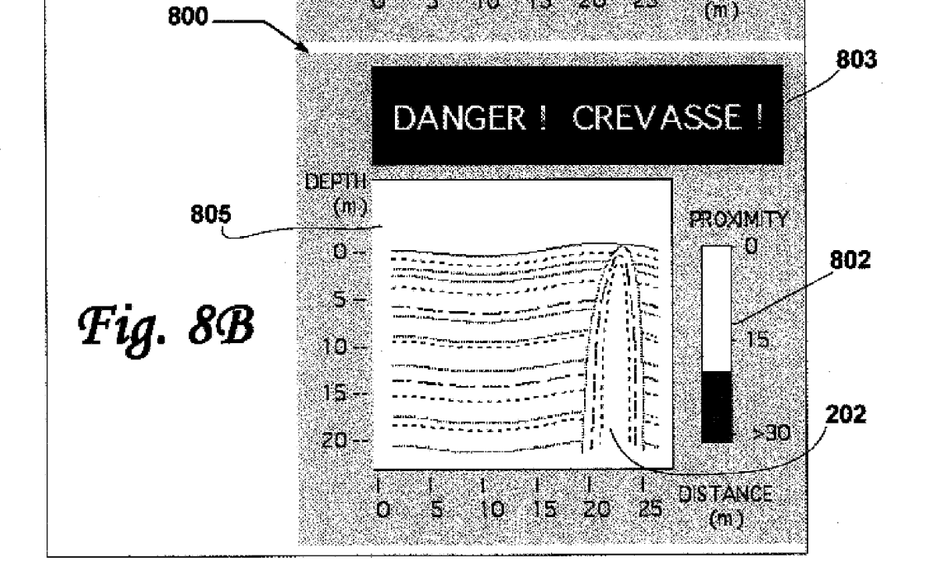
FIG. 8B is a cartoon depicting an alert status of a visual display that may be used with a preferred embodiment of the present invention.

Refer to FIG. 8B. This extracted "bin position" of the peak is used to drive 606 an on-screen visual alarm 607 as depicted in FIG. 8B as a preferred embodiment of a warning mode available to the indicator 800. In this embodiment, this indicator 800 comprises two components: a large image block 805 of the stratigraphy 102 that may change color, such as from green, to yellow, and finally red as distance reduces to a crevasse. This "color block" 805 may include an appropriately phrased warning statement 801, 803 that is also proximity dependent. Further, in a preferred embodiment, a dynamic thermometer-like on-screen graphic 802 indicates the relative proximity of the crevasse. As determined by the peak extract (position detection) function 605, as the antenna 404 closes on a crevasse, the bin number of the peak decreases. This correlates to a higher "thermometer" reading as depicted in FIG. 8B at 802.

Refer to FIGS. 6 and 7. The output, C 610, of the peak extraction function 605, may be processed 700 to also drive a sound card (not shown separately) in the PC 460 to generate 707 an aural alarm output 708 that increases in frequency and volume with proximity to a crevasse. (If, from an ergonomic perspective, the reverse relationship between range to a crevasse and output frequency is desired, it can be accommodated by simple modification of the DSP algorithm.) To accomplish this, the extracted peak value C 610 is input into a multiplier along with a scaling factor for each leg 710, 720 of a parallel process, i.e., scale factor "A" 701 and scale factor "B" 702. Scale factors A 701 and B 702 are set from an ergonomic perspective to provide an optimal audio and visual cue to the proximity of a crevasse.

These scaling factor constants 701, 702 are multiplied 703, 704 by the extracted 605 peak bin number and sent to respective circuits that hold 705, 706 the peak. Typically, peak-hold settings 705, 706 are not user adjustable, except possibly for audio volume. These hold-and delay functions 705, 706, serving as a lag or damper, provide short-term, nearly constant output values. These stabilized outputs are used to set the frequency 707 of the sound card in the PC and the volume of the associated speakers (not shown separately). The peak-hold function 705, 706 is an inherent LPF, eliminating instantaneous variations in tone and volume, such as "warble," that might be present in the alert signal.

While useful as described above, the DSP algorithm may require some initial manual adjustment by a user to produce optimum results, e.g., optimum settings may depend on the average composition of the area to be traversed, be it snow, firn or ice conditions. As a history of operational experience in the field develops, this experience can be used to establish these parameters. A library of selectable settings or feedback loops in the software may be employed to adjust system parameters for optimized operation automatically.

An alternative or supplemental statistical approach can be taken to the detection of crevasses by calculating the standard deviation of all the values in each vector transformed from the time domain to the frequency domain. A trend of relatively steady-state standard deviation calculations may result from radar returns over stable snow cover. As a crevasse is approached and overridden by the radar antenna, the standard deviation increases from the steady-state level. Given an established steady-state baseline, the proximity of a crevasse can be inferred by observing the increase in standard deviation.

While the invention has been described in terms of its preferred embodiments, one skilled in the art will recognize that the invention may be practiced with modifications within the spirit and scope of the appended claims. For example, although the system is described in specific examples for detecting the presence of a crevasse, in particular a bridged crevasse, it will operate on any surface and in conditions that shield visual determination of the stability of the path ahead, such as may occur with dense fog, heavy precipitation or dust storms. It may be suitable for other applications such as determining voids that may signify archaeological sites of importance prior to employing heavy machinery for road building or construction.

Further, the source may be operated with other types of electromagnetic energy such as acoustical and ultrasonic. The algorithm and signal processing may be applicable to implementation with other sensor types including acoustical and ultrasonic. Thus, it is intended that all matter contained in the foregoing description or shown in the accompanying drawings shall be interpreted as illustrative rather than limiting, and the invention should be defined only in accordance with the following claims and their equivalents.

I claim:

1. An inexpensive automated system integrating only the front-end of a commercial-off-the-shelf (COTS) ground-penetrating radar employing as few as one antenna, a COTS personal computer (PC) incorporating purpose-built inexpensive processing circuitry and at least one display mechanism, and as few as one specialized algorithms, wherein said system provides automatic and timely displays of and alerts to voids beneath a surface, said displays and alerts being intuitive to any person in close proximity to said displays.

2. The system of claim 1 in which said alert is aural, wherein said aural alert indicates the relative proximity of said voids.

3. The system of claim 1 further comprising a visual alert function, wherein said visual alert function indicates at least the relative proximity of said voids.

4. The system of claim 1 further comprising both an aural and visual alert function, wherein each said aural and visual alert functions indicates the relative proximity of said voids.

5. The system of claim 1 in which said void is a crevasse.

6. The system of claim 5 in which said crevasse is a bridged crevasse, said bridge comprising snow, ice, firn, and any combination thereof.

7. The system of claim 1 in which said radar front-end is an FM-CW radar front-end, comprising:
    as few as one antenna;
    a transceiver in operable communication with said as few as one antenna, said transceiver incorporating a circulator;
    a local oscillator in operable communication with said transceiver; and
    a mixer in operable communication with said circulator.

8. The system of claim 7 in which said purpose built inexpensive Processing circuitry comprises:
    a low pass filter (LPF) in operable communication with said mixer of said radar front-end;
    a high pass filter (HPF) in operable communication with said LPF;
    an analog-to-digital (A/D) converter in operable communication with said HPF; and
    a digital signal processor (DSP) in operable communication with said A/D converter.

9. The system of claim 1 in which said PC further comprises:
    a sound card; and
    at least one speaker in operable communication with said sound card.

10. The system of claim 1 in which said specialized algorithm processes the same returns from operation of said radar front-end in first and second parallel channels to establish a running average of vectors in said first channel for comparison to each single vector being processed currently by said system in said second channel,
wherein said comparison permits detection of said voids.

11. The FM-CW radar front-end of claim 7 incorporated in a lightweight, inexpensive embodiment mounted on a PC board, the antenna of which may be selected from the group consisting of: a stripline antenna, a stripline beam antenna, a Yagi stripline beam antenna, and a log periodic array (LPA) stripline beam antenna.

12. The FM-CW radar front-end of claim 11 in which said stripline antenna is a printed circuit wide-band bow-tie dipole antenna.

13. An inexpensive method of automatically detecting voids within a target volume and alerting a person proximate to a display mechanism used with said method, said voids not otherwise evident without use of methods that are expensive, time-consuming, or both, comprising:
    illuminating said target volume with electromagnetic energy from a single source placed near a top surface of said volume;
    processing reflections of said electromagnetic energy at derived audio frequencies to establish vectors in first and second parallel channels,
wherein a running average of said vectors is maintained in said first channel for comparison to a current vector being processed in said second channel; and using said comparison to initiate an alert, to display status, or both.

14. The method of claim 13 in which said voids are otherwise hidden from observation.

15. The method of claim 14 in which said voids are crevasses hidden by accretion of snow, ice, firn, and any combination thereof.

16. The method of claim 13 in which said alert is selected from the group consisting of: aural alerts, visual alerts, and a combination thereof.

17. The method of claim 16 in which said aural alert is established by processing scaled signals in parallel to establish the frequency and volume of said aural alert,
wherein said processing of said scaled signals generates an aural tone that intuitively describes the relative distance from said void to an untrained listener.

18. The method of claim 16 in which said visual alert is established by:
subtracting said running average vector processed in said first channel from said vector processed in said second channel;
filtering said result of said subtracting,
wherein said filtering removes spikes that cause speckle;
stacking by m said filtered result to achieve a stacked value,
wherein m is a pre-specified whole number chosen based on experience or experiment;
clipping said stacked value,
wherein said clipping eliminates some amplitude variability that may introduce adverse effects;
peak extracting said clipped stacked value to establish a bin number for said clipped stacked value,
wherein said bin number provides an estimate of distance to a nearest edge of said spatial anomaly;
using said bin number to drive a visual alarm function; and
displaying said visual alarm upon said display mechanism.

19. The method of claim 13 in which detection of voids within a target volume and alerting a person proximate to a display mechanism further comprises:
transforming each said vector to the frequency domain by a Fast FourierTransform;
calculating the standard deviation of all values in each said vector thus transformed;
establishing a trend of relatively steady-state standard deviation calculations resulting from said reflections over a stable cover surface,
wherein as a void is approached and overridden by electromagnetic energy transmitted from said source, said standard deviation trend increases from said steady state level; and
inferring the proximity of said void by observing said increase in said standard deviation.

20. An inexpensive method of detecting and alerting to spatial anomalies within a target volume, said anomalies not otherwise evident without use of methods that are expensive, time-consuming, or both, comprising:
illuminating said target volume with electromagnetic energy from a source placed near a top surface of said volume;
processing reflections of said electromagnetic energy at derived audio frequencies to establish vectors in first and second parallel channels,
wherein a running average of said vectors is maintained in said first channel for comparison to a current vector being processed in said second channel; and
using said comparison to initiate an alert that may be visual, aural, or both,
wherein said visual alert is established by:
subtracting said running average vector processed in said first channel from said vector processed in said second channel;
filtering said result of said subtracting,
wherein said filtering removes spikes that cause speckle;
stacking by m said filtered result to achieve a stacked value,
wherein m is a pre-specified whole number chosen based on experience or experiment;
clipping said stacked value,
wherein said clipping eliminates some amplitude variability that may introduce adverse effects;
peak extracting said clipped stacked value to establish a bin number for said clipped stacked value, wherein said bin number provides an estimate of distance to a nearest edge of said spatial anomaly;
using said bin number to drive a visual alarm function; and
displaying said visual alarm.

21. An inexpensive method of detecting spatial anomalies within a target volume, said anomalies not otherwise evident without use of methods that are expensive, time-consuming, or both, comprising:
illuminating said target volume with electromagnetic energy from a source placed near a top surface of said volume;
placed near a top surface of said volume;
processing reflections of said electromagnetic energy at derived audio
frequencies to establish vectors in first and second parallel channels,
wherein a running average of said vectors is maintained in said first channel for comparison to a current vector being processed in said second channel; and
using said comparison to initiate an alert,
wherein detection of spatial anomalies further comprises:
transforming each said vector to the frequency domain by a Fast Fourier Transform;
calculating the standard deviation of all values in each said vector thus transformed;
establishing a trend of relatively steady-state standard deviation
calculations resulting from said reflections over a stable cover surface,
wherein, as a spatial anomaly is approached and overridden by electromagnetic energy transmitted from said source, said standard deviation trend increases from said steady state level; and
inferring the proximately of said spatial anomaly by observing said increase in said standard deviation.

* * * * *